Oct. 13, 1953     J. O. LE VAN     2,654,990

EQUITORQUE BEARING

Filed May 16, 1951

INVENTOR

JAMES O. LeVAN

BY

ATTORNEY

Patented Oct. 13, 1953

2,654,990

UNITED STATES PATENT OFFICE 2,654,990

EQUITORQUE BEARING

James Oliver Le Van, Lancaster, Pa., assignor to Hamilton Watch Company, Lancaster, Pa.

Application May 16, 1951, Serial No. 226,666

2 Claims. (Cl. 58—140)

This invention relates to the bearing support between the balance staff of a watch and the olived and endstone jewels.

The object of the invention is to provide a bearing structure which will produce the same frictional torque whatever position the watch is in, and whether the frictional contact is between the balance wheel staff and the olived hole jewel or between the balance wheel staff and the endstone.

A further object of the present invention is to provide a cupped endstone which contacts the outer periphery of the end of the balance wheel staff to produce a torque when the staff is in a vertical position which will be substantially equal to the torque when the staff is in a horizontal position.

It is a further object of the present invention to shape the end of the balance staff so that contact with a flat endstone is along the periphery of the end of said staff to equalize the torque occasioned by friction with the bearing in either a horizontal or a vertical position.

It is a still further object of the present invention to so polish and shape the peripheral edge of the end of the balance staff pivot that contact between the endstone and said peripheral edge will not damage the bearing.

The invention is shown in the accompanying drawing in which.

Figure 4:
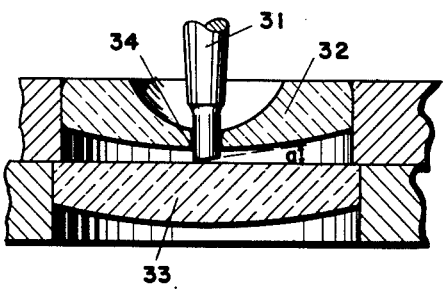
Figure 4 is a similar view showing a flat endstone and the balance wheel staff end cut at an angle to provide contact with the endstone at the outer edge of the surface.
Figure 5:
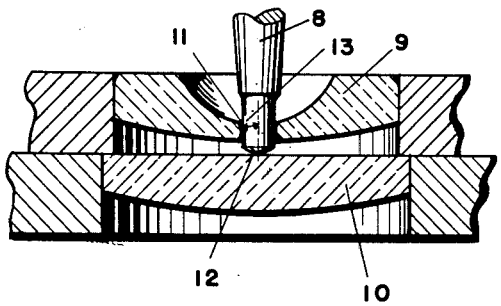
Figure 5 shows the present method of journalling the end of the balance wheel staff.

Referring first to Figure 5 which shows the present day method for mounting a balance wheel staff 8 in a bearing mounting consisting of an olived hole jewel 9 and an endstone 10, at which the contact with the olived stone is at the point 11 and contact with the endstone is at the point 12. It will readily be seen that assuming the frictional coefficient to be constant between the metal of the staff 8 and the sapphire bearings 9 and 10, the retarding frictional torque when the staff is in a horizontal position will be greater than when the staff is in a vertical position due to the distance 13 from the point of contact 11 to the center axis of the cylindrical staff 8. When the staff is in the horizontal position the contact is with the olived hole jewel 9 and the frictional force at 11 must be multiplied by the radius 13 of the end of the staff 8 to find the frictional torque, while when the staff is vertical the contact at 12 is theoretically directly at the center of the staff 8 and consequently with the shorter lever arm there would be much less frictional torque. The present invention, as shown in Figures 1, 2, 3, and 4, seeks to equalize the frictional torque in the horizontal and vertical positions of the staff by changing the point of contact of the staff with the endstone from a single point center contact to a peripheral contact with the outer edges of the end of the pivot staff.

Figure 1:
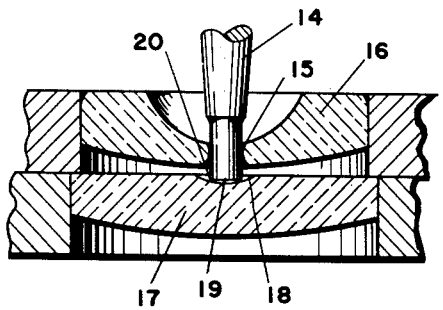
Figure 1 is a cross section of the bearing and the end of the balance staff, showing a cupped endstone.

Referring particularly to Figure 1, a staff 14 has pivotal contact at 15 with an olived hole jewel 16 in a manner similar to that shown in Figure 5. The endstone 17 is formed with a shallow spherical depression 18 and the contact between the end 19 of the staff 14 is at the periphery 20 of said end. This periphery is rounded, as shown at 21 in Figure 6, to prevent sharp edge contact between the staff and the endstone 17. Again assuming the frictional force between the staff and the endstone is equal to the frictional force between the staff and the olived hole jewel, the frictional torque applied to the staff will now be more equalized, the frictional torque in the horizontal position being substantially equal to the frictional torque in the vertical position to equalize the periods of the balance wheel oscillation and to help eliminate the isochronal error.

Figure 2:
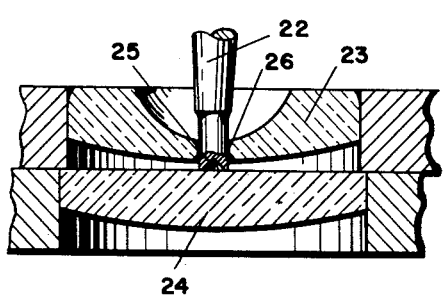
Figure 2 is a similar view showing a flat endstone and a conically bored staff.

Referring to Figure 2, a similar construction is shown with a balance wheel staff 22 and an olived hole jewel 23. A flat endstone 24 is used to provide bearing contact with the end of the staff 22. The end of the staff is formed with a cone-shaped depression 25, the edges 26 of the periphery of said end being rounded similar to that shown at 21. This construction, while different from that shown in Figure 1, produces the same effect and tends to equalize the frictional torque in both the horizontal and vertical positions.

Figure 3:
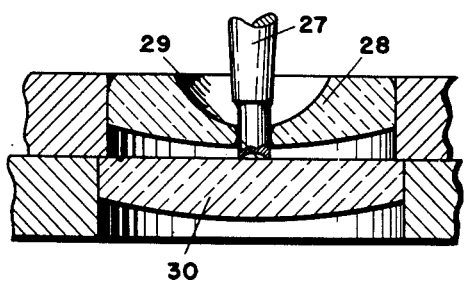
Figure 3 is a similar view showing a flat endstone and a cupped staff end.

Figure 3 shows a pivot staff 27 mounted similarly in an olived hole jewel 28, the end of the staff being formed with a spherical depression 29 to contact a flat endstone 30 in a manner very similar to that shown in Figure 2. Again the periphery of the end is rounded similarly to that shown at 21.

Figure 6:
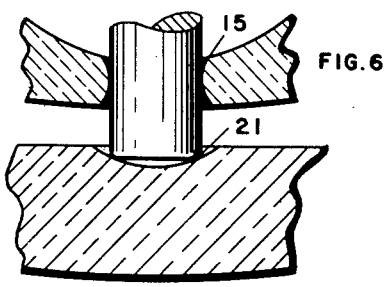
Figure 6 is an enlarged view showing the rounded edge of the end of the staff.

Figure 4 shows a staff 31 similarly mounted in an olived hole jewel 32 but cut at an angle "a" to provide an edge contact with a flat endstone 33, which will provide equal frictional torque for both the horizontal and the vertical positions of the staff. The end 34 in contact with the endstone 33 is rounded, as shown in Figure 6 at 21.

The structure shown in Figures 1, 2, 3, and 4, while slightly different, all function to the same end, to produce equal frictional torque in both the horizontal and vertical positions of the balance staff. With equal frictional torque the period of motion of the balance wheel becomes more nearly equal in the different positions of the watch and renders it much simpler to bring the watch to a steady rate and produce a better timekeeper.

What is claimed is:

1. A bearing assembly for a balance wheel pivot staff, comprising an olived stone and an endstone, said pivot staff being formed at one end with a conical depression to provide contact with the endstone at the outer circumferential edge of the end of said pivot staff, said circumferential edge being rounded.

2. A bearing assembly for a balance wheel pivot staff, comprising an olived stone and an endstone, said pivot staff being formed with a cup shaped depression in one end to provide outer circumferential contact of said end with said endstone, the circumferential contact edge being rounded.

JAMES O. LE VAN.

References Cited in the file of this patent

FOREIGN PATENTS

| Number | Country | Date |
|--------|---------|------|
| 239,786 | Switzerland | Mar. 1, 1946 |
| 251,443 | Switzerland | Aug. 2, 1948 |
| 254,857 | Switzerland | Jan. 3, 1949 |